United States Patent
Itakura et al.

(10) Patent No.: US 6,764,046 B2
(45) Date of Patent: Jul. 20, 2004

(54) CEILING SPEAKER SYSTEM OF AIRCRAFT

(75) Inventors: Ryoichi Itakura, Tokyo (JP); Katsuhiko Umeda, Tokyo (JP)

(73) Assignee: Jamco Corporation, Tokyo (JP)

( * ) Notice: Subject to any disclaimer, the term of this patent is extended or adjusted under 35 U.S.C. 154(b) by 0 days.

(21) Appl. No.: 10/337,821

(22) Filed: Jan. 8, 2003

(65) Prior Publication Data

US 2003/0141414 A1 Jul. 31, 2003

(30) Foreign Application Priority Data

Jan. 29, 2002 (JP) ........................................ 2002-019693

(51) Int. Cl.$^7$ ............................................. B64D 11/00
(52) U.S. Cl. ........................ 244/118.5; 381/89; 381/152
(58) Field of Search .................... 244/118.5; 381/89, 381/152

(56) References Cited

U.S. PATENT DOCUMENTS

| | | | | |
|---|---|---|---|---|
| 4,385,210 A | * | 5/1983 | Marquiss | 381/431 |
| 4,520,237 A | * | 5/1985 | Murakami | 381/412 |
| 5,701,359 A | * | 12/1997 | Guenther et al. | 381/431 |
| 5,804,906 A | * | 9/1998 | Tsutsumi | 310/322 |
| 6,058,196 A | * | 5/2000 | Heron | 381/152 |
| 6,097,829 A | * | 8/2000 | Guenther et al. | 381/425 |
| 6,215,884 B1 | * | 4/2001 | Parrella et al. | 381/190 |
| 6,259,800 B1 | * | 7/2001 | Tagami | 381/412 |
| 6,304,435 B1 | * | 10/2001 | Hsu | 361/683 |
| 6,438,242 B1 | * | 8/2002 | Howarth | 381/190 |

OTHER PUBLICATIONS

Rebecca Day, "Hang 'Em High", [online] posted Nov. 2001 [retrieved Jul. 12, 2003], Popular Mechanics, retrieved from the Intenet <URL http://popularmechanics.com/technology/audo/1998/9/_Flat_Panel_Stereo_Speakers/print.html>.*

* cited by examiner

Primary Examiner—Michael J. Carone
Assistant Examiner—Daniel Matz
(74) Attorney, Agent, or Firm—Westerman, Hattori, Daniels & Adrian, LLP (57) ABSTRACT

A ceiling panel speaker 100 comprises ceiling panel vibrating plates 110 and exciter units 200 mounted on said vibrating plates 110, each exciter unit 200 connected via line 270 to an amplifier not shown. The ceiling panel vibrating plates 110 are aligned to form a longitudinal size $L_1$ extending above one or more aisles within the cabin, so that the ceiling panel speaker 100 realizes a long surface sound source. The sound waves output from the ceiling panel speaker 100 are transmitted along inner wall panels 12 etc. and spread throughout the closed space of the passenger cabin 50.

9 Claims, 6 Drawing Sheets

Fig. 11

CEILING SPEAKER SYSTEM OF AIRCRAFT

FIELD OF THE INVENTION

The present invention relates to a ceiling speaker system of an aircraft.

DESCRIPTION OF THE RELATED ART

There are many small-sized speakers equipped to the passenger cabin of an aircraft for in-flight announcements.

It is important that all the passengers on board the aircraft are able to clearly hear the in-flight announcements, such as emergency guidance, which may be directly related to their safety. Therefore, in a conventional large-sized aircraft, three speakers are mounted on the lower face of the overhead compartment per one transversal row of eight passenger seats, the speakers spaced to correspond to the interval of the seats.

Figure 11:
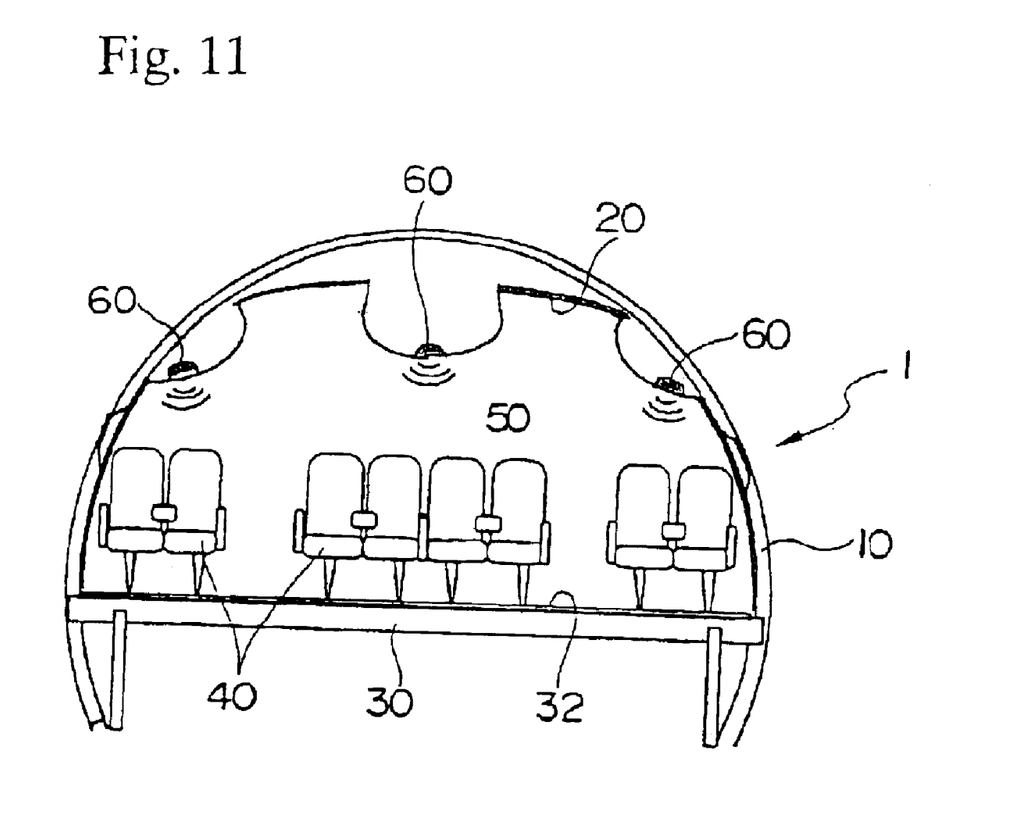
FIG. 11 is an explanatory view showing the mounting position of speakers in a typical prior art aircraft.

FIG. 11 is an explanatory view showing the cross-sectional structure of the conventional cabin of an aircraft.

The aircraft illustrated as a whole by reference number 1 comprises a body 10, a floor 30 disposed within the body 10, with rows of passenger seats 40 fixed to the floor 30. In the drawings, there are two passages (aisles) 32 separating the eight seats that constitute one transversal row of seats.

Overhead stowage bins etc. for stowing baggage are provided on the ceiling 20, and plural speakers 60 are mounted on appropriate positions of the bins etc. to provide in-flight announcements to the cabin 50.

There is approximately a 1.2-meter interval between one seat and the seat in front of or behind it.

A typical passenger cabin of an aircraft is as long as 40 meters, so there are approximately 100 speakers equipped within the cabin. The weight of one speaker is around 160 grams, so the total weight of speakers mounted on a mid-sized aircraft is around 16 kilograms. The wiring connecting the speakers is complex and also heavy.

Since the vibrating plate area of each of the small-sized speakers equipped in the aircraft is only approximately 44 $cm^2$, the sound provided through the speaker is similar to that output from a point sound source having no surface area, which is diffused and attenuated in proportion to the square of distance. Therefore, even if the sound output through the speaker has a sufficient sound pressure level and may seem too loud near the speaker, the passengers seated somewhat far from the speaker cannot make out the sound clearly.

Reducing the number of speakers would only increase this undesired tendency, so many speakers must be equipped to the aircraft to assure comfort and safety of passengers.

Further, pleasant background music can be played through the speakers in the cabin to welcome passengers on board the aircraft, so it is preferable that the speakers output a high quality sound with a wide tone range. However, due to limited mounting space and weight, the miniaturization of the speakers is considered to be important and the quality of sound is thereby sacrificed.

SUMMARY OF THE INVENTION

The present invention aims at reducing the number of speakers on the aircraft so as to reduce the total weight and cost related thereto, without diminishing the comfort and safety of the passengers.

In other words, the present invention aims at providing a speaker system that minimizes the attenuation of sound from the speaker so that the sound is not too loud near the speaker but still reaches the whole cabin without fail.

The present invention solves the problem mentioned above by structuring the ceiling panels of the aircraft as a speaker having a large vibrating plate area, utilizing the characteristics that there is only small diffusion attenuation to the sound output from a surface sound source.

Since the sound from a surface sound source with a large surface area has directivity, only small diffusion attenuation occurs thereto.

Moreover, since the ceiling panels of the passenger cabin are aligned continuously along the axial direction of the aircraft, the sound output from the panels are free from attenuation in the axial direction when the ceiling panels are vibrated as a whole.

Even further, since the cabin has a cylindrical cross-section, diffusion in the direction orthogonal to the axis (the transverse direction) is suppressed, and theoretically the sound is delivered to every corner of the cabin of the aircraft maintaining appropriate volume.

There are a number of requirements listed later that the ceiling panels of the aircraft must fulfill in order to exert their fundamental functions. The ceiling panels according to the present invention are designed to fulfill all those requirements, and in addition, have appropriate sizes and flexural properties to function as acoustic vibrating plates realizing a ceiling speaker system.

An exciter is equipped to each panel so that all the panels are vibrated in phase by the power from an amplifier.

DETAILED DESCRIPTION OF THE PREFERRED EMBODIMENT

Figure 1:
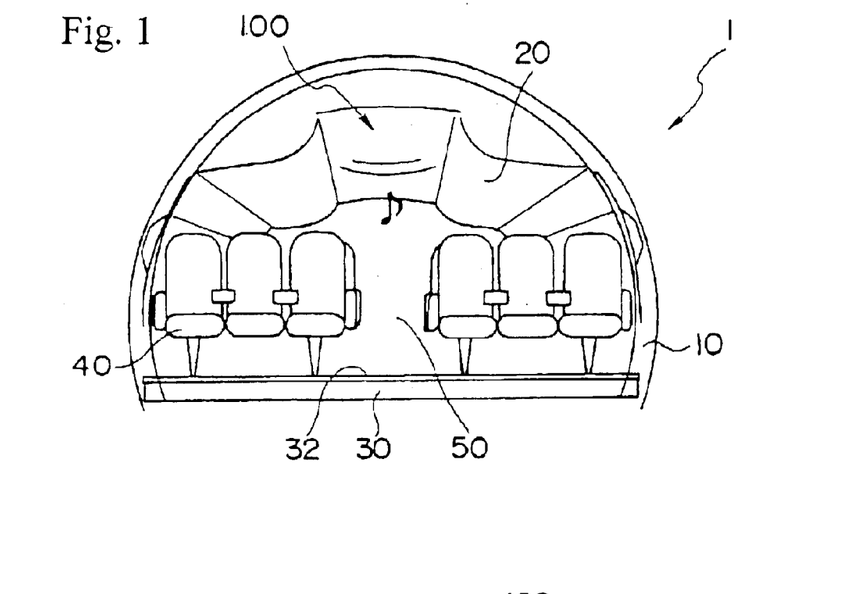
FIG. 1 is an explanatory view showing the present speaker system utilizing the ceiling panels within a cabin of an aircraft as vibrating plates.
Figure 2:
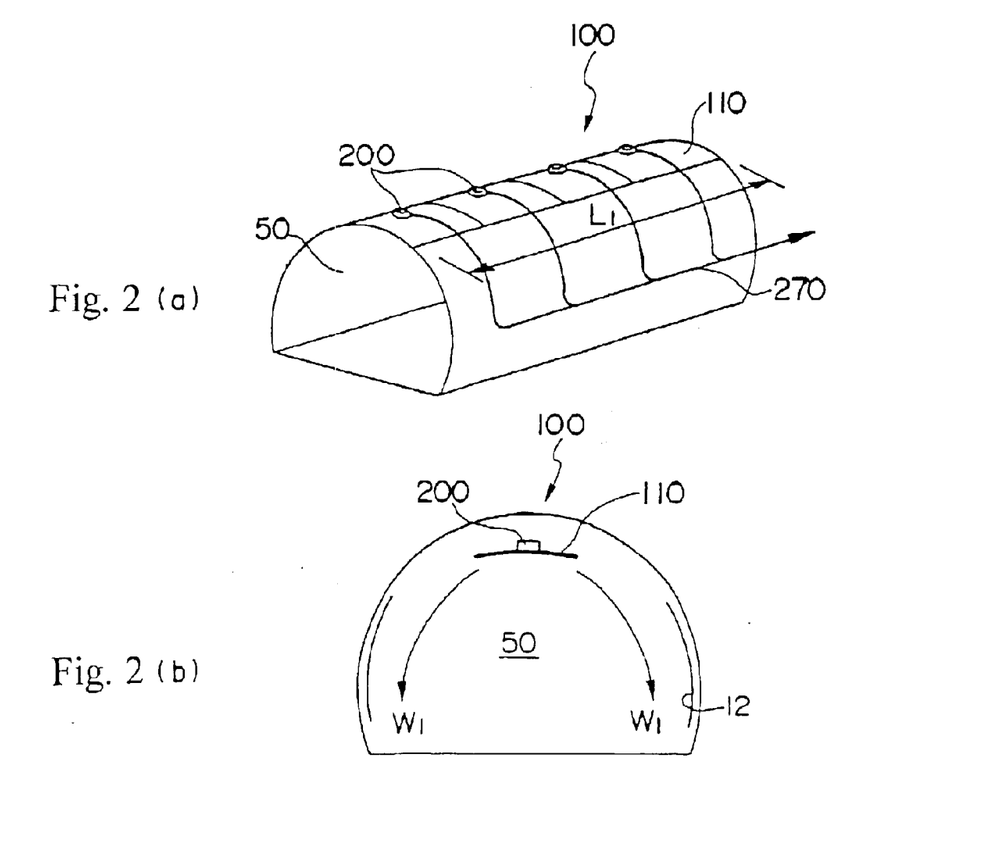
FIG. 2 is an explanatory view of the speaker system utilizing the ceiling panels as vibrating plates.

FIG. 1 is an explanatory view showing the cabin of an aircraft illustrating the preferred embodiment of the present invention, and FIG. 2 is an explanatory view of the ceiling panel speaker.

An aircraft 1 comprises a body 10 and a floor 30 disposed therein, and on the upper surface of the floor 30 are seats 40 arranged in rows with an aisle 30 provided in the middle. Stowage bins etc. are provided to a ceiling 20 of a passenger cabin 50.

In the present embodiment, one aisle 32 is provided within the passenger cabin 50, and a ceiling panel speaker 100 is provided above the aisle 32.

The ceiling panel speaker 100 comprises ceiling panel vibrating plates 110 and exciter units 200 mounted on the ceiling panel vibrating plates 110, the exciter units 200 being connected to an amplifier not shown through lines 270.

The ceiling panels are continuously arranged to have a longitudinal length $L_1$ along the aisle 32, and thus the ceiling panel speaker 100 has a long surface sound source.

The sound waves output from the ceiling panel speaker 100 are transferred along the inner wall panels 12 and spread throughout the enclosed space of the passenger cabin 50.

Figure 3:
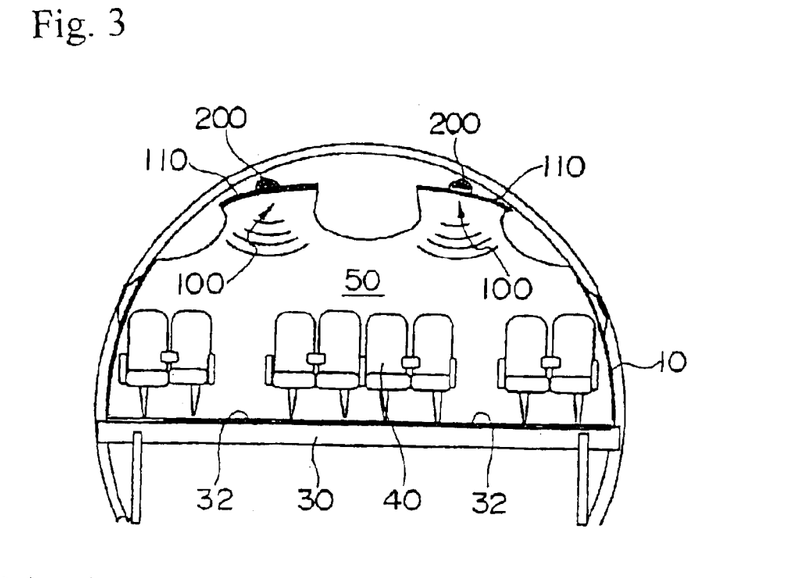
FIG. 3 is an explanatory view of the speaker system utilizing the ceiling panels as vibrating plates.

FIG. 3 illustrates an example where two aisles 32 are provided on a floor 30.

On the area above the two aisles 32 are provided ceiling panel speakers 100, formed longitudinally along the aisles.

The ceiling panel speakers 100 comprise ceiling panel vibrating plates 110 and exciter units 200, similar to the foregoing embodiment.

Next, we will compare the diffusion attenuation of the sound output from a point sound source as in the prior art and that output from a surface sound source according to the speaker of the present invention.

Figure 4:
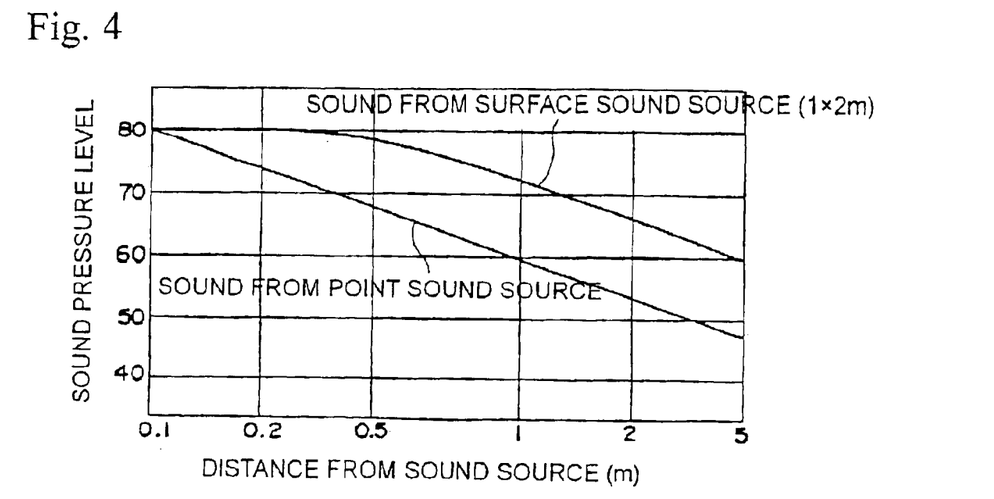
FIG. 4 is an explanatory view illustrating the theoretical attenuation of sound from a point sound source and that from a surface sound source.

FIG. 4 illustrates the theoretical attenuation of the sound output from a point sound source and that of the sound output from a surface sound source, the size of the surface sound source being 1 m×2 m, wherein the horizontal axis represents the distance from the sound source and the vertical axis represents the sound pressure level. Sound attenuation is caused by the diffusion of sound, so it is therefore called diffusion attenuation.

Apart from diffusion attenuation, sound attenuation may be caused by viscous damping due to the viscosity of air, but the attenuation caused by viscous damping is as little as around 1 db per 100 meters, so it can be ignored in this description.

The sound from a point sound source is attenuated in proportion to the square of distance (i.e. the sound is attenuated to ¼ at double distance). This is expressed as 6 db/D.D. (D.D. being an abbreviation of double distance).

Since the sound from a surface sound source has directional characteristics, attenuation starts after the sound has traveled for some distance. This distance is determined, theoretically, to be $1/\pi$ the length of the shorter side of the surface sound source. In other words, according to theory, sound is attenuated by 3 db/D.D. starting from a distance of $1/\pi$ the length of the shorter side of width or length of the surface sound source, and is attenuated by 6 db/D.D. starting from a distance of $1/\pi$ the length of the longer side.

The sound from a surface sound source having a size of 1 meter×2 meters starts to attenuate at approximately 0.3 meters from the source by 3 db/D.D., and starts to attenuate at approximately 0.6 meters from the source by 6 db/D.D.

In the cabin of an aircraft, the distance from the speaker to the ears of the passengers is approximately one meter, so consideration is made on how the sound pressure level at one meter distance from a surface sound source is set to equal the sound pressure level at the same distance from a point sound source.

Figure 5:
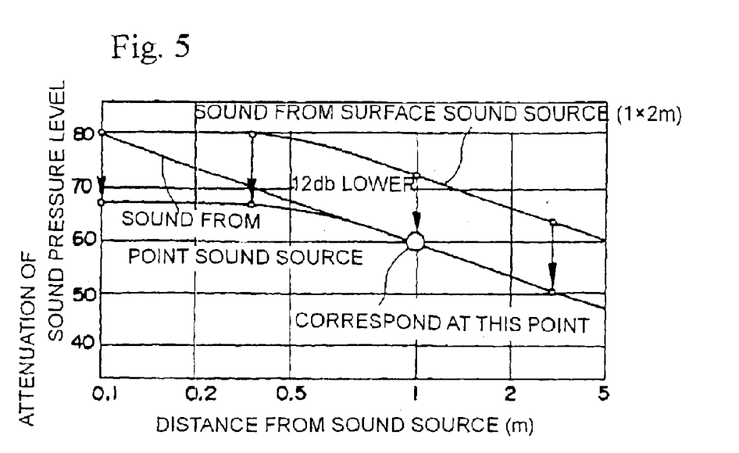
FIG. 5 is an explanatory view showing an example where the sound pressure level at a one-meter distance from a point sound source and that from a surface sound source are set to correspond.

A graph shown in FIG. 5 is obtained based on FIG. 4. According to the graph shown in FIG. 5, it is understood that if the sound pressure level at a one-meter distance from the sound source is set to 60 db, the sound pressure level of the sound output from a point sound source must be as large as 80 db while the sound pressure level of the sound output from a surface sound source can be as small as 66 db, 14 db smaller than the output of the point sound source.

In other words, the sound output from a surface sound source reaches passengers who are seated relatively far from the source to hear the sound clearly, but at the same time, the sound is not too loud even near the source so that the passengers close to it will not feel annoyed.

Accordingly, the realization of this theory can not only reduce the number of speakers to be mounted on an aircraft without diminishing the comfort or the safety of passengers on board, but also improves the quality of sound on the aircraft since a speaker having a large surface area can output rich bass tones.

At present, mid-sized aircrafts generally have one center aisle in the cabin, and large-sized aircrafts generally have two aisles.

The width of one aisle is determined according to security reasons, and in general aircrafts, the width of the ceiling panel over the aisle is approximately 1.2 meters. Therefore, the above-explained theory can be realized area-wise if the longitudinal length of the panel is set to 2 meters or more.

However, the above-described theory refers to the case where the surface sound source having a size of 1×2 meters vibrates altogether without causing divisional vibration, so the vibration plate of the ceiling panel speaker must be designed to have appropriate properties such as flexural properties, and in addition, the number and position of exciters mounted on a panel must be selected carefully to realize such simultaneous vibration. Especially, it is important that the panels be vibrated electrically in phase.

Next, we will explain the requirements for a ceiling panel of an aircraft.

The ceiling panel of the aircraft is not responsible for the strength of the aircraft body, but it must fulfill following requirements or realize following functions:

1. A pleasant appearance that constitutes the interior of the passenger cabin;
2. A light reflector for indirectly lighting the cabin;
3. A sound insulating board preventing noise from entering the cabin;
4. A means to prevent stack effect caused during fire;
5. A safety means for passengers and cabin crew who may collide against the panel during emergency landing or turbulence;
6. A means being both fire resistant and vibration proof;
7. A means to prevent condensed water from dropping; and
8. A means to rectify the flow of air conditioning within the cabin.

The ceiling panel of the conventional aircraft cabin satisfies the above-listed requirements, though its structure differs per airline, and in many cases the appearance, weight and safety are considered to be the most important requirements.

As for the ceiling panel material, small-sized aircrafts often adopt an aluminum alloy plate covered with heavy-weight cloth or leather, and large-sized aircrafts often utilize a lightweight laminated panel formed by adhering glass fiber fabric on a honeycomb core.

Acoustic requirements for the panel will now be explained. When the ceiling panels of the aircraft are utilized to constitute a speaker, the speaker is designed so that its vibrating plates are continuously arranged along the axial direction (longitudinal direction) of the aircraft, meaning that the surface sound source has a sufficiently long side length. Furthermore, the sound output from the speaker travels along the cylindrical wall surface of the aircraft in the direction orthogonal to the axial direction (transverse direction) and will not be diffused, so theoretically, the sound will not be attenuated.

Figure 6:
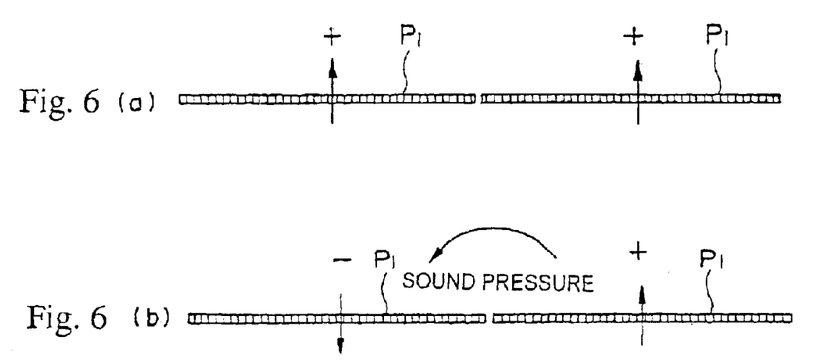
FIG. 6 is an explanatory view showing the vibration phase of the vibrating plates.

However, this theory is based on the assumption that all the ceiling panels $P_1$ are vibrated integrally, and if, for example, the adjacent ceiling panel $P_1$ is vibrated in opposite phase, the sound is cancelled and extinguished (refer to FIG. 6).

The actual vibration of the panels is not an integral vibration, but rather, a divisional vibration, and the vibration mode is varied according to frequency.

Therefore, in order to realize the present theory in a ceiling speaker system, the vibration mode of the panels must be studied to search the most appropriate vibrating position for the exciters to be placed, and the wiring from an amplifier must be designed appropriately to drive all the panels in phase. The acoustic characteristics that the ceiling panels must satisfy are very important.

If exciters are mounted to the ceiling panels of a conventional aircraft (especially to those having a low flexural property), the exciters may drive the panels to vibrate locally and output sound, but since the output is not in phase, it is impossible to realize the desired attenuation property.

Therefore, according to the present invention, the ceiling panels functioning as the vibrating plates of the speaker system adopt a lightweight sandwich structure formed of a composite material having high flexural rigidity.

The acoustic properties of a general panel are determined by mass law where the panel density is the major factor and stiffness law where the panel stiffness is the major factor. If the panel density is too high, shortage of excitation force occurs in proportion to frequency, and high frequency tones are lost.

Along with the increase in stiffness, the characteristic frequency of the panel rises, by which the attenuation of sound below the characteristic frequency is increased.

Figure 7:
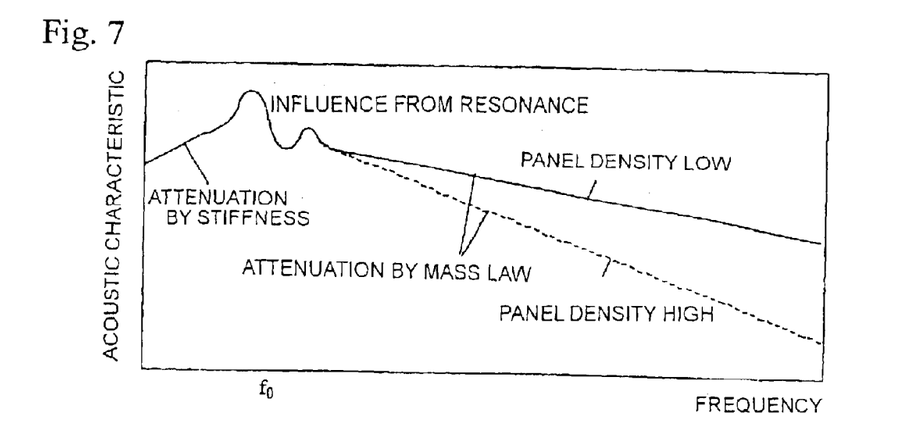
FIG. 7 is an explanatory view illustrating the vibration characteristics of a general panel.

FIG. 7 illustrates the acoustic characteristics of a panel being utilized as a vibrating plate.

According to the present invention, the flexural rigidity of the panel was increased and the most appropriate positions for locating the exciters were searched for, in order to reduce divided vibration and cut down attenuation.

As explained, amid-sized aircraft generally has one center aisle in the cabin, and a large-sized aircraft has two aisles, the width of the ceiling panel positioned above the aisle being approximately 1.2 meters.

The length of the panels differ according to each aircraft, but in order to facilitate handling etc., the length of each panel is determined to be 1.0 meter in the present invention. Therefore, the area of a single ceiling panel, in other words, the vibration plate area of a single speaker, is approximately 1.2 square meters. Such panels are arranged continuously.

Materials that can be utilized for the speaker system are limited due to the fire-resistant property required to the parts constituting the aircraft. Several materials were selected out of the possible materials to produce trial models for experiments, and by the experiments, it has been discovered that a panel formed of the following materials and following design satisfies all the requirements for a ceiling panel of the aircraft and realizes a good sound quality at the same time.

Surface layer: A prepreg formed by solidifying glass fiber fabric with phenol resin
Thickness: 0.1 mm
Core material: An aramid fiber honeycomb core
Cell size: 3.2 mm
Specific weight: 0.048
Size: Thickness 12 mm
Width 1200 mm
Length 1000 mm Since a decorative film is adhered on the surface of the panel to provide good appearance, the density of the panel is approximately 1.4 $kg/m^2$.

Next, the vibration pattern of the ceiling panel is actually measured to obtain the most preferable location for mounting the exciter.

Figure 8:
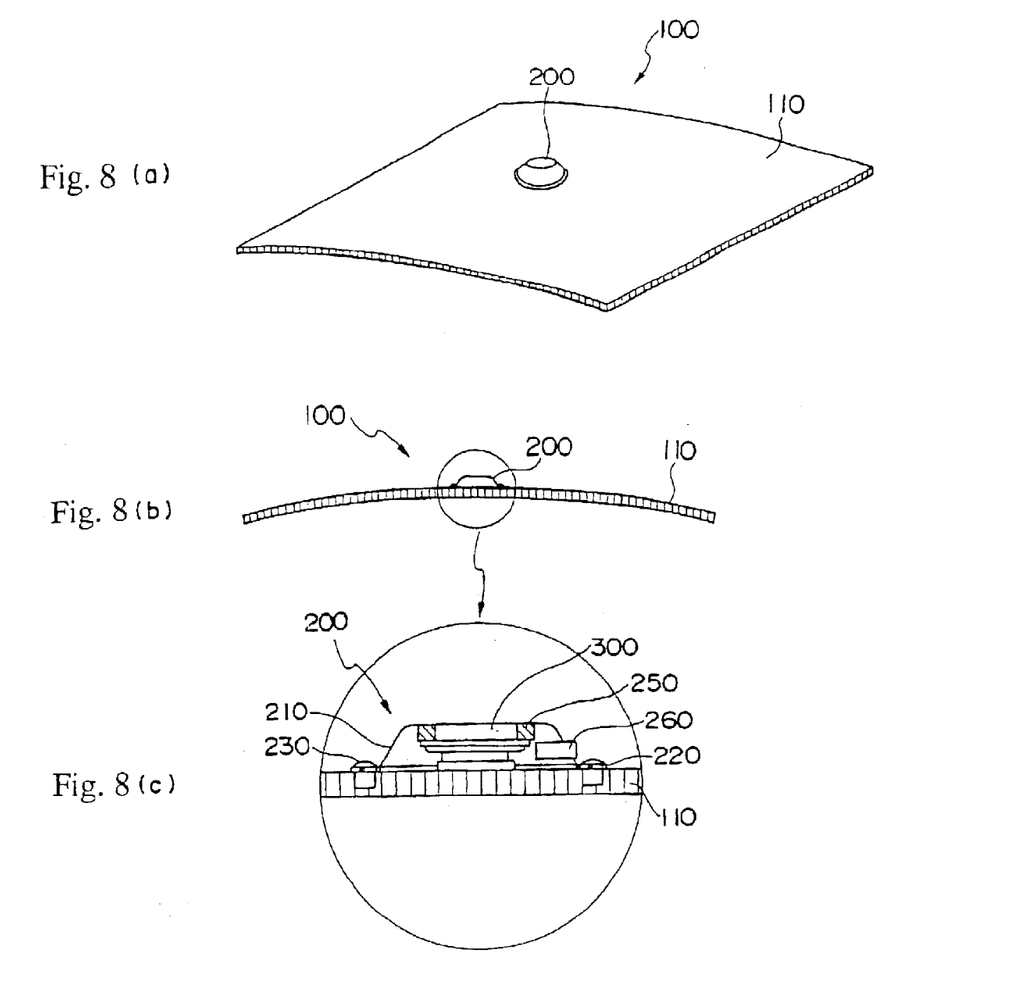
FIG. 8 is an explanatory view illustrating the structure of the ceiling panel speaker and the method of mounting the exciter thereto.

FIG. 8 illustrates the structure of the ceiling panel speaker and the method of mounting the exciter.

Figure 9A:
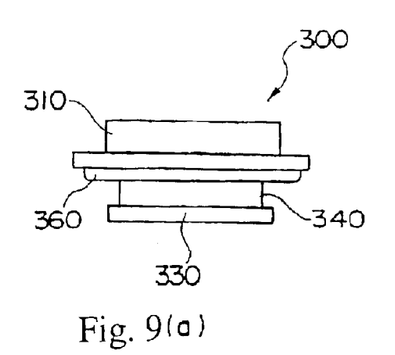
FIG. 9 is an explanatory view showing the structure of the exciter.
Figure 9B:
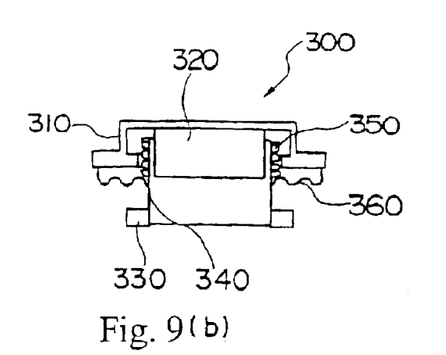

The enlarged view of FIG. 8(c) shows the detailed cross section of the exciter, and FIG. 9 shows the structure of the exciter unit.

An exciter unit 200 is mounted on a housing 210, the housing 210 being fixed to the vibration plate 110 via a gasket 220 with screws 230.

An exciter 300 is fixed to the interior of the housing 210 via a sponge cushion 250. The housing 210 is further equipped with an electric terminal 260.

The exciter 300 comprises a yoke 310, and at the center of the yoke is mounted a cylindrical magnet 320. To the outer periphery of the magnet 320 is fit a pipe-like bobbin 340, and to the outer periphery of the bobbin 340 is wound a voice coil 350.

The yoke 310 and the bobbin 340 are connected via a damper 360, and the bobbin 340 is adhered to the vibrating plate 110 via a flange 330.

When sound reproduction current travels through the voice coil 350, the voice coil is driven according to the strength of the current, by which the vibrating plate connected thereto vibrates and reproduces the sound. The flange 330 of the voice coil bobbin is bonded to the vibrating plate 110.

Since plural voice coils are connected to an amplifier in parallel, and since all the voice coils must be driven in phase, it is required that the wiring from the amplifier be designed accordingly.

An experiment was performed with a ceiling speaker using six mockup ceiling panels of a large-sized aircraft to prove the effect of the present invention, and this experiment confirmed that the ceiling speaker system outputs a desirable sound quality that is not too loud near the sound source but reaches far areas clearly.

In conventional jumbo jets, sets of three speakers were mounted at 1.2-meter intervals within the cabin, but it was confirmed by this experiment that according to the present ceiling speaker system, only sets of two exciters were required to be mounted at one-meter intervals.

As a result, the number of speakers (or exciters) to be mounted is reduced to 80% and the weight per each speaker is reduced to 44%, which brings the total weight down to 35%, in other words, the present speaker system reduces the weight of speakers by 65%.

The present ceiling speaker system not only reduces the weight of the speakers significantly, but also enables to cut down the space and cost related to mounting the speakers in the cabin of the aircraft.

Figure 10:
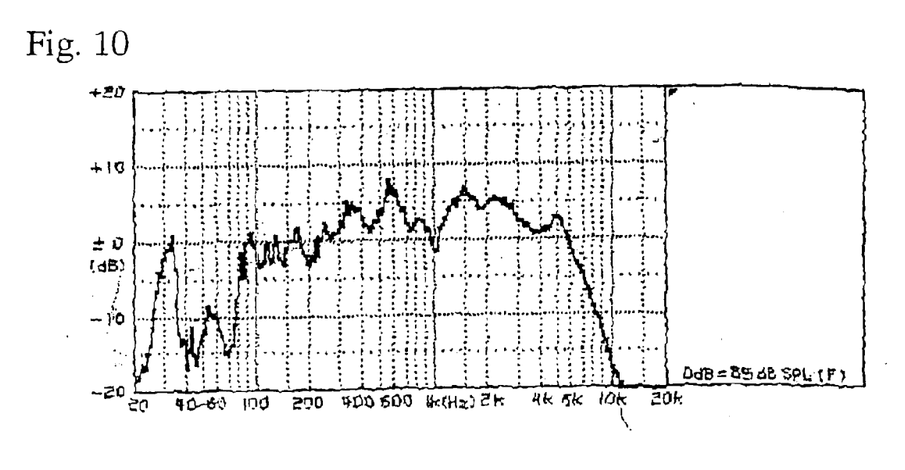
FIG. 10 is an explanatory view showing the frequency characteristics of the experimental panel speaker.

FIG. 10 shows the frequency characteristics of an experimental mockup panel speaker formed as the model of the ceiling speaker of an aircraft.

What is claimed is:

1. A ceiling speaker system of an aircraft comprising forming the ceiling of a cabin of an aircraft with vibrating plates composed of continuously arranged panels, said panels each having acoustically appropriate area size and flexural rigidity with one or more exciter units mounted thereto, said exciter units vibrating said panels in phase.

2. A ceiling speaker system of an aircraft comprising forming the ceiling above an aisle in a cabin of an aircraft with vibrating plates composed of continuously arranged panels, said panels having exciter units mounted thereto, said exciter units vibrating said panels in phase.

3. A ceiling speaker system of an aircraft according to claim 1 or claim 2, wherein each of said panels is composed of a honeycomb core member and a glass fiber fabric.

4. A ceiling speaker system of an aircraft comprising forming the ceiling of a cabin of an aircraft with vibrating plates composed of continuously arranged panels, said panels each having acoustically appropriate area size and flexural rigidity with one or more exciter units mounted thereto, said exciter units vibrating said panels in phase,
wherein each of said panels has a light-weight sandwich structure with high flexural rigidity formed of composite material.

5. A ceiling speaker system of an aircraft comprising forming the ceiling above an aisle in a cabin of an aircraft with vibrating plates composed of continuously arranged panels, said panels having exciter units mounted thereto, said exciter units vibrating said panels in phase,
wherein each of said panels has a light-weight sandwich structure with high flexural rigidity formed of composite material.

6. A ceiling speaker system of an aircraft comprising forming the ceiling of a cabin of an aircraft with vibrating plates composed of continuously arranged panels, said panels each having acoustically appropriate area size and flexural rigidity with one or more exciter units mounted thereto, said exciter units vibrating said panels in phase,
wherein each of said panels is composed of a honeycomb core member and a glass fiber fabric.

7. A ceiling speaker system of an aircraft comprising forming the ceiling above an aisle in a cabin of an aircraft with vibrating plates composed of continuously arranged panels, said panels having exciter units mounted thereto, said exciter units vibrating said panels in phase,
wherein each of said panels is composed of a honeycomb core member and a glass fiber fabric.

8. A ceiling speaker system of an aircraft comprising forming the ceiling of a cabin of an aircraft with vibrating plates composed of continuously arranged panels, said panels each having acoustically appropriate area size and flexural rigidity with one or more exciter units mounted thereto, said exciter units vibrating said panels in phase,
wherein each of said panels is composed of an aramid fiber honeycomb core and a prepreg surface layer formed by solidifying glass fiber fabric with phenol resin.

9. A ceiling speaker system of an aircraft comprising forming the ceiling above an aisle in a cabin of an aircraft with vibrating plates composed of continuously arranged panels, said panels having exciter units mounted thereto, said exciter units vibrating said panels in phase,
wherein each of said panels is composed of an aramid fiber honeycomb core and a prepreg surface layer formed by solidifying glass fiber fabric with phenol resin.

* * * * *